(12) United States Patent
Yannam et al.

(10) Patent No.: US 11,935,532 B2
(45) Date of Patent: Mar. 19, 2024

(54) METHODS AND APPARATUS FOR LEVERAGING AN APPLICATION PROGRAMMING INTERFACE ("API") REQUEST FOR STORING A LIST OF SENTIMENT VALUES IN REAL TIME INTERACTIVE RESPONSE SYSTEMS

(71) Applicant: Bank of America Corporation, Charlotte, NC (US)

(72) Inventors: Ramakrishna R. Yannam, The Colony, TX (US); Emad Noorizadeh, Plano, TX (US); Isaac Persing, Sierra Vista, AZ (US); Sushil Golani, Charlotte, NC (US); Hari Gopalkrishnan, Plainsboro, NJ (US); Dana Patrice Morrow Branch, Celina, TX (US)

(73) Assignee: Bank of America Corporation, Charlotte, NC (US)

( * ) Notice: Subject to any disclaimer, the term of this patent is extended or adjusted under 35 U.S.C. 154(b) by 355 days.

(21) Appl. No.: 17/539,301

(22) Filed: Dec. 1, 2021

(65) Prior Publication Data

US 2023/0169969 A1 Jun. 1, 2023

(51) Int. Cl.
*G10L 15/22* (2006.01)
*G10L 15/06* (2013.01)
(Continued)

(52) U.S. Cl.
CPC ............ *G10L 15/22* (2013.01); *G10L 15/063* (2013.01); *G10L 15/16* (2013.01); *G10L 15/30* (2013.01); *G10L 2015/223* (2013.01)

(58) Field of Classification Search
CPC ...................................................... G06F 40/35
See application file for complete search history.

(56) References Cited

U.S. PATENT DOCUMENTS

| 11,749,282 B1 * | 9/2023 | Mandal ................. G06F 40/279 |
| | | 704/251 |
| 2017/0053323 A1 * | 2/2017 | Steelberg ........... G06Q 30/0276 |

(Continued)

OTHER PUBLICATIONS

Al-Ayyoub, Mahmoud, et al. "Hierarchical classifiers for multi-way sentiment analysis of arabic reviews." International Journal of Advanced Computer Science and Applications 7.2 (2016). (Year: 2016).*

*Primary Examiner* — Douglas Godbold
(74) *Attorney, Agent, or Firm* — Weiss & Arons LLP

(57) ABSTRACT

Aspects of the disclosure relate to receiving a stateless application programming interface ("API") request. The API request may store an utterance, previous utterance data and a sequence of labels, each label in the sequence of labels being associated with a previous utterance expressed by a user during an interaction. The previous utterance data may, in certain embodiments, be limited to a pre-determined number of utterances occurring prior to the utterance. Embodiments process the utterance, using a natural language processor in electronic communication with the first processor, to output an utterance intent, a semantic meaning of the utterance and an utterance parameter. The utterance parameter may include words in the utterance and be associated with the intent. The natural language processor may append the utterance intent, the semantic meaning of the utterance and the utterance parameter to the API request. A signal extractor processor may append the plurality of utterance signals to the API request.

19 Claims, 13 Drawing Sheets

(51) Int. Cl.
*G10L 15/16* (2006.01)
*G10L 15/30* (2013.01)

(56) References Cited

U.S. PATENT DOCUMENTS

| | | | | |
|---|---|---|---|---|
| 2017/0084295 | A1* | 3/2017 | Tsiartas | G10L 17/08 |
| 2019/0005951 | A1* | 1/2019 | Kang | G10L 15/22 |
| 2019/0013017 | A1* | 1/2019 | Kang | G10L 25/51 |
| 2021/0375272 | A1* | 12/2021 | Madwed | G06F 3/167 |
| 2022/0253611 | A1* | 8/2022 | Galitsky | G06N 5/01 |
| 2022/0335223 | A1* | 10/2022 | Tripathi | G06F 40/35 |
| 2023/0169957 | A1* | 6/2023 | Yannam | G10L 15/30 |
| | | | | 704/259 |
| 2023/0169958 | A1* | 6/2023 | Persing | H04M 3/527 |
| | | | | 704/232 |
| 2023/0169964 | A1* | 6/2023 | Yannam | G06F 3/04817 |
| | | | | 704/232 |
| 2023/0169968 | A1* | 6/2023 | Persing | G06N 3/006 |
| | | | | 704/270 |
| 2023/0169969 | A1* | 6/2023 | Yannam | G10L 15/16 |
| | | | | 704/270 |

* cited by examiner

| Rule | Label | Signal(s) |
|------|-------|-----------|
| R1 | Upset | =Upset |
| R2 | Affirm | =YES |
| R3 | Deny | =NO |
| R4 | DidNotUnderstand (HelpSuggestion) | =CurrentIntent-SI_HELP_SUGGESTIONS, Signal=Input-Repeated(DifferentIntent) |

FIG. 2

| Sentiment Score | Definition of Sentiment Score |
|---|---|
| -2 | Very negative |
| -1 | Negative, frustration from the number of steps, repeated process |
| 0 | Mid-flows and cases not sure |
| 1 | Conversation goes smooth |
| 2 | Very Positive |

FIG. 3

| Utterance ⟵403 | Input Mode ⟵405 | Response ⟵407 | Label ⟵409 | Sentiment Score ⟵411, ⟵401 |
|---|---|---|---|---|
| How do I transfer money to my other savings account? | Text | No problem, to which account? | FirstUtteranceAndIntentPredicted | 0 |
| Advantage Savings**** | Gesture | No problem, how much would you like to transfer? | ClickParmeter | 1 |
| 100 | Text | Alright, would like to send this transfer now or schdule it for later? | Expected Parameter | 1 |
| Send now | Gesture | Okay, you want to sent $100.00 from adv plus banking**** to adv savings**** on 4/4/2020 | Click Parameter | 1 |
| Yes | Gesture | You're all set, your money was transferred. | Affirm | 1 |

FIG. 4A

| Utterance | Input Mode | Response | Label | Sentiment Sore |
|---|---|---|---|---|
| How do I transfer money to my other savings account? | Text | Let's see, to which account? | Cycle | 0 |
| Wedding | Gesture | Sure, from which account? | ClickParameter | 1 |
| adv plus savings**** | Gesture | No problem, how much would you like to transfer? | ClickParameter | 1 |
| 50 | Text | Okay, would you like to send this transfer now or schedule it for later? | Expected Parameter | 1 |
| Send now | Gesture | Okay, you want to send $50.00 from adv plus banking**** to wedding**** on 4/4/2020. | Click Parameter | 1 |
| yes | Gesture | You're all set, you money was transferred. | Affirm | 1 |
| Wow, amazing! | Text | Thank you! | Positive | 2 |
| Thank you, more! | Text | You're welcome. | Positive | 2 |

FIG. 4B

| Utterance | Response | Label | Sentiment Score |
|---|---|---|---|
| I did not receive all of the check that I ordered. I did not receive package one of five, so who did I call to report this to you? | Here are some things I can do:... | NotSure(Help Suggestion) | 0 |
| Shipping options for check orders | It depends on the shipping method you selected. Here are your options:... | ClickSuggestion | 1 |
| I only received | Here are some things I can do:... | NotSure(Help Suggestion) | -1 |
| I need to check on the status of the | Let's see, for a business or personal account? | NotInterestedIn Suggestion | -1 |
| Personal account | No problem, what kind of transaction or charge do need a status update on? | ClickParameter | 0 |
| I need a status update on the receipt of the checks that I ordered | It depends on the shipping method you selected. Here are your options:... | Cycle | -1 |
| I need to speak to a representative because I did not receive all of the checks that I ordered | I can help with these things right now:... or, if you can give me a little more information, I can connect you to the right specialist. | RequestLiveAgent | -1 |

FIG. 5A

| Utterance 503 | Response 505 | Label 507 | Sentiment Score 509 |
|---|---|---|---|
| I only received a partial | Okay, which of your cards are you calling about? | Repeat | -1 |
| I'm not talking about my cards | Please be a bit more specific. Which of your cards are you calling about? | NoSentiment/Mid Flow | -1 |
| None of them | It doesn't look like you have an account for that. How else can I help you? | ClickParameter | -1 |
| I need to speak to a representative because I did not receive all of the checks that I ordered on my personal checking account. | I can help you with these things right now…or I can connect you with someone. | Cycle | -1 |
| Call now | Thank you, Alright. For which account? | RequestLiveAgent (Gesture) | -1 |

FIG. 5B

| Utterance | Response | Label | Sentiment Score |
|---|---|---|---|
| Send money to someone | Who would you like to send money to?... | FirstUtteranceAndClickButton | 0 |
| Add someone using email | I can take you to your transfer settings, and we'll talk again when you're done... | ClickParameter | 1 |
| Let's go | Let me pull that up for you... | Click Parameter | 1 |
| ???? | I can take you to your transfer settings, and we'll talk again when you're done... | NoSentimentMidFlow | 0 |
| Let's go | Let me pull that up for you... | Cycle | -1 |
| Send money | Alright. Would you like to make a transfer between your accounts, send money to someone, or pay a bill?... | Cycle | -1 |
| Send money to someone | Who would you like to send money to?... | Cycle | -1 |

FIG. 6

METHODS AND APPARATUS FOR LEVERAGING AN APPLICATION PROGRAMMING INTERFACE ("API") REQUEST FOR STORING A LIST OF SENTIMENT VALUES IN REAL TIME INTERACTIVE RESPONSE SYSTEMS

FIELD OF TECHNOLOGY

Aspects of the disclosure relate to leveraging sentiment values for use in interactive voice response systems.

BACKGROUND OF THE DISCLOSURE

Interactive response systems are computer-based systems that communicate with users of the system. Exemplary interactive response systems include interactive voice response systems configured to communicate with a user via verbal messages, and chatbots configured to communicate with a user via text messages. The interactive response systems can receive inputs from the user via text, audio and/or gesture (e.g., selection of a displayed icon).

The interactive response systems receive inputs from a user. After an input is received, the system generates a response. Generating the response typically includes iterating through pre-stored rules to identify a suitable response based on the received input.

At times, the response generated by the interactive response system may be misunderstood by, or frustrate, the user. Such suboptimal responses may result in user disappointment with an entity hosting the interactive response system, and may result in negative reviews, unfulfilled business opportunities and, possibly, the loss of the user as an entity customer. However, as the interactive response system is an automated computer system, user emotion such as frustration or discontent is not identified by the system and, as such, is not addressed during the user-system interactions.

At this time, options exist for a customer to rate his interaction with the interactive response system by selecting a happy or sad smiley face after the interaction. This rating system is not useful at least because a customer rarely selects the happy/sad smiley face after the interaction and, even when the face is selected, it provides no clues as to which system response triggered the positive/negative review.

It would be desirable, therefore, to provide systems and methods for enabling the interactive voice response system to identify and score user sentiment in real time for each discrete portion of a conversation. The scoring of user sentiment for discrete conversation portions may be used by the interactive response system to select an appropriate system response to each user utterance and to pinpoint suboptimal system responses.

Machine learning ("ML") is used today for a variety of predictive purposes. ML leverages an algorithm trained using training data to make its predictions. Using machine learning to predict sentiment of a conversation, however, presents a programming team with multiple difficulties. A large number of words/phrases may be used when conversing with the interactive response system. Thus, the volume of training data required to train the algorithm for recognizing sentiment is necessarily huge. Additionally, because understanding sentiment of a current utterance may require knowledge of previous utterances, a large volume of data must be input into the ML to understand the utterance in context. Such methods require the ML algorithm to utilize considerable processing resources to identify user sentiment and may result in delayed output.

As such, it is further desirable to provide systems and methods that leverage ML to predict conversation sentiment without necessitating complex training data sets and large data inputs.

It is yet further desirable to provide systems and methods that leverage an application programming interface ("API") request for use in storing a list of sentiment values in real time interactive response systems.

SUMMARY OF THE DISCLOSURE

Apparatus for pre-processing a user utterance prior to feeding utterance-related data to a sequential neural network classifier for conversation sentiment scoring is provided. The utterance may be expressed, by a user, to an interactive response system during an interaction between the user and the interactive response system. The apparatus may include a plurality of distributed servers. Each of the plurality of distributed servers may include a conversation manager. Each conversation manager may include a first processor for receiving a stateless application programming interface ("API") request.

The API request may store, in a configurable memory, the utterance, previous utterance data and a sequence of labels. Each label in the sequence of labels may be associated with a previous utterance expressed by a user during the interaction. The previous utterance data may be limited to a pre-determined maximum number of utterances occurring immediately prior to, or at least before in time, the utterance.

The server may also include a natural language processor, in electronic communication with the first processor. The natural language processor may process the utterance to output an utterance intent, a semantic meaning of the utterance and an utterance parameter. The utterance parameter may include one or more words included in the utterance and be associated with the intent. The natural language processor may be further configured to append the utterance intent, the semantic meaning of the utterance and the utterance parameter to the API request.

The server may also include a signal extractor for processing the utterance, the utterance intent, the semantic meaning, the utterance parameter, and the previous utterance data extracted from the API request to generate a plurality of utterance signals. The signal extractor may be configured to append the plurality of utterance signals to the API request.

The server may also include an utterance sentiment classifier. The utterance sentiment classifier may include a memory for storing a hierarchy of rules. Each rule in the hierarchy of rules may be associated with one or more rule signals and a label. The utterance classifier may also include a processor for, in response to receiving the one or more utterance signals from the signal extractor, iterating through the hierarchy of rules to identify a first rule in the hierarchy for which the one or more utterance signals is a superset of the first rule's one or more rule signals.

The second processor is further configured to append, to the sequence of labels stored in the API request, a label associated with the first rule.

A sequential neural network classifier may also be included in, or stored on, the server. The sequential neural network classifier may be used for receiving a data input including the sequence of labels and the label associated with the first rule. Preferably, the data input not include the utterance itself.

The sequential neural network classifier may process the data input using a trained algorithm. Based on the processing, the sequential neural network classifier may append a sentiment score to the API request. The sentiment score may be associated, within the API request, to the utterance.

The conversation manager and/or the processor associated therewith, may, in certain embodiments, identify a response to the user utterance based on the utterance intent, the label and the sentiment score. The conversation manager and/or the processor associated therewith may append the response to the API request. Following the appending, the conversation manager and/or the processor associated therewith may transmit the API request to the interactive response system.

The interactive response system may receive the API request and output the response included therein to the user.

Pre-processing the utterance using the natural language processor, the signal extractor and the utterance sentiment classifier reduces the data input to the label and the sequence of labels. This, in turn, increases a speed at which the sequential neural network classifier returns the sentiment score and decreases resources consumed by the sequential neural network classifier when processing the data input.

The configurable memory may be configurable to store a first quantity of utterance signals. In some embodiments, the configurable memory may be configured to store 10 utterance signals.

The utterance sentiment classifier may, itself, be further configured to, in response to a determination that a stored previous utterance is associated with the first rule and the sentiment score associated with the previous utterance is above a threshold value, terminate the iterating.

BRIEF DESCRIPTION OF THE DRAWINGS

The objects and advantages of the invention will be apparent upon consideration of the following detailed description, taken in conjunction with the accompanying drawings, in which like reference characters refer to like parts throughout, and in which:

FIG. 2 shows an illustrative diagram in accordance with the invention;

FIG. 3 shows an illustrative diagram in accordance with the invention;

FIG. 4A shows an illustrative flow diagram in accordance with the invention;

FIG. 4B shows an illustrative flow diagram in accordance with the invention;

FIG. 5A shows an illustrative flow diagram in accordance with the invention;

FIG. 5B shows an illustrative flow diagram in accordance with the invention;

FIG. 6 shows an illustrative flow diagram in accordance with the invention;

DETAILED DESCRIPTION OF THE DISCLOSURE

Figure 1:
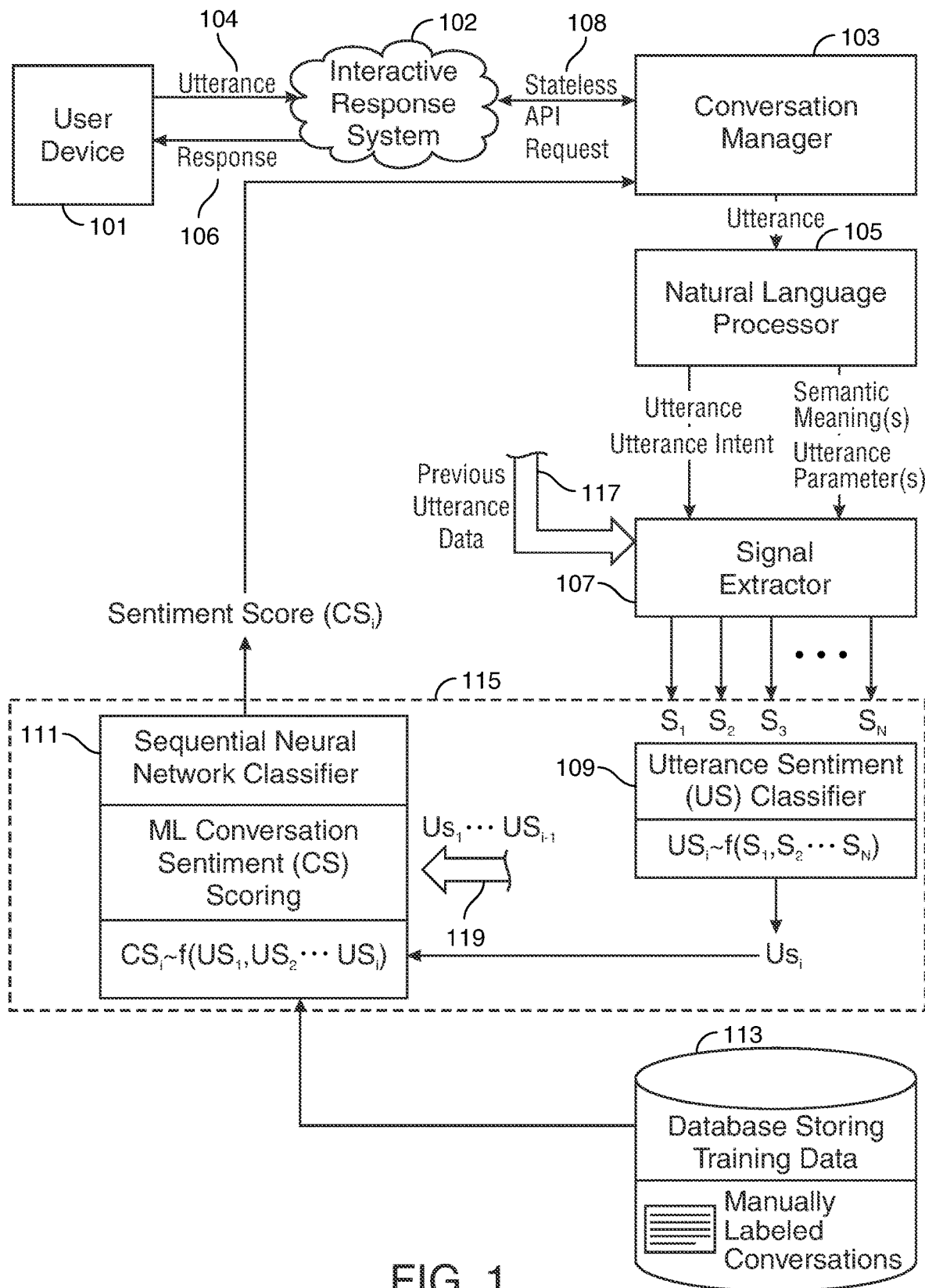
FIG. 1 shows illustrative apparatus and methods in accordance with the invention.

Apparatus for pre-processing of a user utterance prior to feeding utterance-related data to a sequential neural network classifier for conversation sentiment scoring is provided. The utterance may have been expressed by a user to an interactive response system during an interaction between the user and the interactive response system. The apparatus may include a plurality of distributed servers. Each of the plurality of distributed servers may include a conversation manager including a first processor for receiving a stateless application programming interface ("API") request.

The API request may store, in a configurable memory, the utterance, previous utterance data and a sequence of labels. Each label in the sequence of labels may be associated with a previous utterance expressed by a user during the interaction. The previous utterance data may be limited to a pre-determined number of utterances occurring immediately prior, or just prior, to the utterance.

Each distributed server may also include a natural language processor, in electronic communication with the first processor, for processing the utterance to output an utterance intent, a semantic meaning of the utterance and an utterance parameter. The utterance parameter may include one or more words included in the utterance and be associated with the intent. The natural language processor may be further configured to append the utterance intent, the semantic meaning of the utterance and the utterance parameter to the API request.

Each distributed server may include a signal extractor for processing the utterance, the utterance intent, the semantic meaning, the utterance parameter, and the previous utterance data extracted from the API request to generate a plurality of utterance signals. The signal extractor may be configured to append the plurality of utterance signals to the API request.

Each distributed server may include an utterance sentiment classifier. The utterance sentiment classifier may include a memory for storing a hierarchy of rules. Each rule in the hierarchy of rules may be associated with one or more rule signals and a label. The utterance sentiment classifier may also include a second processor for, in response to receiving the one or more utterance signals from the signal extractor, iterating through the hierarchy of rules to identify a first rule in the hierarchy for which the one or more utterance signals is a superset of the first rule's one or more rule signals.

The second processor may be further configured to append, to the sequence of labels stored in the API request, a label associated with the first rule.

Some embodiments may further include a sequential neural network classifier for receiving a data input including the sequence of labels and the label associated with the first rule. The data input may preferably not include the utterance.

The sequential neural network classifier may also process the data input using a trained algorithm and, based on the processing, appending a sentiment score to the API request. The sentiment score is preferably associated, within the API request, to the utterance.

The conversation manager may identify a response to the user utterance based on the utterance intent, the label and the sentiment score. Then the conversation manager may append the response to the API request. After the appending, the conversation manager may transmit the API request to the interactive response system. Preferably, the interactive response system may be used for receiving the API request and outputting the response included therein to the user. In embodiments of the current disclosure, the pre-processing of the utterance by the natural language processor, the signal extractor and the utterance sentiment classifier reduces the data input to the label and the sequence of labels, thereby increasing a speed at which the sequential neural network classifier returns the sentiment score and decreasing resources consumed by the sequential neural network classifier when processing the data input.

In certain embodiments, the configurable memory may be configurable to store a first quantity of utterance signals. The configurable memory may be configured to store 10 utterance signals, or some other suitable number of utterance signals.

The utterance sentiment classifier may, in certain embodiments, be further configured to, in response to a determination that a stored previous utterance is associated with the first rule and the sentiment score associated with the previous utterance is above a threshold value, terminate the iterating.

In some embodiments, the previous utterance data may include, for each previous utterance expressed by the user during the interaction: the previous utterance, an intent of the previous utterance, and a parameter of the previous utterance. The previous utterance data may include data relating to the pre-determined number of previous utterances. The previous utterance data, for each previous utterance, may include the previous utterance, an intent, and a term in the previous utterance associated with the intent.

The signal extractor may, in certain embodiments, generate an utterance signal in response to a determination that the utterance intent is identical to an intent of a previous utterance.

The previous utterance data may, in some embodiments, include a plurality of semantic meanings. Each of the plurality of semantic meanings may be associated with one of the plurality of previous utterances. The signal extractor may, in certain embodiments, generate an utterance signal in response to a determination that the semantic meaning of the utterance is substantially similar to a semantic meaning associated with one of the plurality of previous utterances.

Some embodiments of the disclosure may include a third processor for feeding the sequential neural network with training data prior to the sequential neural network receiving the data input. The training may include feeding an untrained algorithm with multiple sequences of labels. Each label may be stored in each sequence of labels being associated with a sentiment score. The training may modify the untrained algorithm to become the trained algorithm.

Apparatus and methods described herein are illustrative. Apparatus and methods in accordance with this disclosure will now be described in connection with the figures, which form a part hereof. The figures show illustrative features of apparatus and method steps in accordance with the principles of this disclosure. It is to be understood that other embodiments may be utilized and that structural, functional and procedural modifications may be made without departing from the scope and spirit of the present disclosure.

The steps of methods may be performed in an order other than the order shown or described herein. Embodiments may omit steps shown or described in connection with illustrative methods. Embodiments may include steps that are neither shown nor described in connection with illustrative methods.

Illustrative method steps may be combined. For example, an illustrative method may include steps shown in connection with another illustrative method.

Apparatus may omit features shown or described in connection with illustrative apparatus. Embodiments may include features that are neither shown nor described in connection with the illustrative apparatus. Features of illustrative apparatus may be combined. For example, an illustrative embodiment may include features shown in connection with another illustrative embodiment.

Illustrative embodiments of apparatus and methods in accordance with the principles of the invention will now be described with reference to the accompanying drawings, which form a part hereof. It is to be understood that other embodiments may be utilized, and structural, functional and procedural modifications may be made without departing from the scope and spirit of the present invention.

The drawings show illustrative features of apparatus and methods in accordance with the principles of the invention. The features are illustrated in the context of selected embodiments. It will be understood that features shown in connection with one of the embodiments may be practiced in accordance with the principles of the invention along with features shown in connection with another of the embodiments.

One of ordinary skill in the art will appreciate that the steps shown and described herein may be performed in other than the recited order and that one or more steps illustrated may be optional. The methods of the above-referenced embodiments may involve the use of any suitable elements, steps, computer-executable instructions, or computer-readable data structures. In this regard, other embodiments are disclosed herein as well that can be partially or wholly implemented on a computer-readable medium, for example, by storing computer-executable instructions or programs or by utilizing computer-readable data structures.

FIG. 1 shows illustrative apparatus and methods in accordance with the invention. Apparatus illustrated in FIG. 1 includes user device 101, interactive response system 102, conversation manager 103, natural language processor ("NLP") 105, signal extractor 107, utterance sentiment classifier 109, sequential neural network classifier 111 and database storing training data 113.

The apparatus illustrated in FIG. 1 includes arrows representing a flow of data between the apparatus. In FIG. 1, conversation manager 103 is illustrated as transmitting data to NLP 105 and receiving data from sequential neural network classifier 111. Conversation manager may also support communications allowing for data transmission and/or receipt to some or all of NLP 105, signal extractor 107, utterance sentiment classifier 109, sequential neural network classifier 111 and database storing training data 113. Additional data connections may be established between some or all of NLP 105, signal extractor 107, utterance sentiment classifier 109, sequential neural network classifier 111 and database storing training data 113.

Conversation manager 103 may also be in communication with one or more user databases (not shown). Conversation manager may retrieve from these database(s) user data, such as, for example, user identifying information, user account information, and any other suitable data.

User device 101 is illustrated transmitting utterance 104 to interactive response system 102. Interactive response system 102 may be a cloud-based API running on the user device, an API accessed by the user device through an internet connection, an interactive voice response system communicating with the user device via a telephony line, or any other suitable system. Interactive response system 102 may add the received utterance to stateless API request 108 and transmit stateless API request 108 to conversation manager 103. Utterance 104 may be expressed by a user during an interaction with an interactive response system as described herein.

Conversation manager 103 may transmit utterance 104 to NLP 105. NLP 105 may process utterance 104 to output an utterance intent, and other related data associated with utterance 104, such as semantic meaning and one or more utterance parameters. The output utterance data and, in some embodiments, utterance 104, may be transmitted to signal extractor 107 by NLP 105 or conversation manager 103.

Signal extractor 107 may receive utterance 104 and utterance data from NLP 105. Signal extractor 107 may also receive previous utterance data 117. Previous utterance data 117 may be fed to signal extractor 107 by NLP 105 or conversation manager 103.

Signal extractor 107 may process the data output by NLP 105 and previous utterance data 117. Signal extractor 107 may use one or more rules, algorithms, and/or ML to identify one or more signals.

The one or more signals may be fed to utterance sentiment classifier 109. Utterance sentiment classifier may store a plurality of rules, ordered in a hierarchy, each rule being associated with one or more signals 51 SN and a label. Utterance sentiment classifier 109 may use the received signals 51 SN to identify a rule in the stored rules-based hierarchy for which the received signals are a superset of the identified rule's signals.

Utterance sentiment classifier 109 may output label USi of the identified rule to sequential neural network classifier 111. Sequential neural network classifier 111 may receive label USi from utterance sentiment classifier 109. Sequential neural network classifier 111 may also receive sequence 119 of labels US1 . . . USi−1 from utterance sentiment classifier 109 or conversation manager 103. Sequence 119 of labels US1 . . . USi−1 may be an ordered set of historical labels associated with previous utterances uttered by the user during the interaction with the interactive response system. Sequence 119 of labels US1 . . . USi−1 may include the historical labels ordered, in sequence, from the first or earliest generated label in the interaction to the last, or latest, generated label in the interaction. The latest generated label may be a label generated immediately preceding label USi.

Sequential neural network classifier 111 may use a trained algorithm identify a sentiment score based on input labels US1 . . . USi. The trained algorithm may output a sentiment score CSi based on the processing of input labels US1 . . . USi−1. The trained algorithm may be created by feeding an untrained algorithm with a plurality of manually labeled conversations. The manually labeled conversations may be stored in database storing training data 113. The manually labeled conversations may include a sequence of labels extracted from a conversation, with each label in the sequence being assigned a sentiment score.

In some embodiments, utterance sentiment classifier 109 and sequential neural network classifier 111 may be part of the same component 115. In other embodiments, utterance sentiment classifier 109 and sequential neural network classifier 111 may be separate components.

Sequential neural network classifier 111 may output sentiment score CSi to conversation manager 103. In some embodiments, sequential neural network classifier 111 may also transmit to conversation manager 103 label USi. In other embodiments, utterance sentiment classifier 109 may transmit label USi to conversation manager 103.

Conversation manager 103 may receive sentiment score CSi and label USi. Conversation manager 103 may feed this data, in addition to the utterance intent generated by NLP 105, to one or more rules-based algorithms and/or ML algorithms to identify response 106 to utterance 104. Conversation manager 103 may then transmit response 106 to interactive response system 102 via stateless API request 108. Interactive response system may receive stateless API request 108 from conversation manager 103, and subsequently transmit response 106 to user device 101. The response may be included in the stateless API request received by conversation manager 103. The stateless API request may be augmented not only with the response, but also with some or all of sentiment score CSi, label USi, utterance intent, semantic meaning, utterance parameters and/or signals S1 . . . SN.

FIG. 2 shows illustrative diagram 201 in accordance with the invention. In diagram 201, illustrative rules 202 are shown. One or more of illustrative rules 202 may be included in the utterance sentiment classifier's hierarchy of rules.

Each of rules 202 are associated with a label 203 and a signal 205. In diagram 201, Rule R1 is associated with the label 'upset' and the signal 'upset.' Signal 'upset' may be output by the signal extractor when the text of the utterance includes a term such as 'upset' or another term showing upset emotions. Rule R2 is associated with the label 'affirm' and the signal 'YES.' Signal 'YES' may be output by the signal extractor when the utterance includes the term 'yes' or something similar. Rule R3 is associated with the label 'deny' and the signal 'NO.' Signal 'NO' may be output by the signal extractor when the utterance includes the word 'NO' or something similar. Rule R4 is associated with the label 'DidNotUnderstand(HelpSuggestion)' and the signal 'CurrentIntent-SI_Help Suggestions, Signal=Input-Repeated(DifferentIntent).' The aforementioned signal may be output by the signal extractor when the utterance is nearly identical to a previous utterance, and the previous utterance has a different intent then the previous utterance.

FIG. 3 shows illustrative diagram 301. Illustrative diagram 301 includes an exemplary list of sentiment scores and their associated definitions. Diagram 301 includes first column 303 having header 'Sentiment Score' and second column 305 having header 'Definition of Sentiment Score.' The sentiment scores illustrated in diagram 301 show an illustrative range of sentiment scores that may be used by the sequential neural network classifier to classify an utterance.

In diagram 301, row 307 includes a sentiment score of '-2' and an associated definition of 'Very negative.' Row 309 includes a sentiment score of '-1' and an associated definition of 'Negative, frustration from the number of steps, repeated process.' Row 311 includes a sentiment score of '0' and an associated definition of 'Mid-flows and cases not sure.' Row 313 includes a sentiment score of '1' and an associated definition of 'Conversation goes smooth.' Row 315 includes a sentiment score of '2' and an associated definition of 'Very Positive.'

FIGS. 4A-4B show an exemplary interaction between a user and an interactive response system in diagram 401. The exemplary interaction illustrated in diagram 401 is an interaction for which the sequential neural network classifier assigned positive sentiment scores. Data displayed in diagram 401 for each interaction includes utterance 403, input mode 405, response 407, label 409 and sentiment score 411.

In diagram 401, input mode 405 is either text or gesture. An input mode of 'text' may refer to a user inputting text via typing on a computer or smartphone during a chat session with the interactive response system. An input mode of 'gesture' may refer to a user making a selection of an icon displayed on his computing device. For example, response 'no problem, to which account?' may also include displaying to the user multiple selectable icons, each icon identifying one of the user's accounts. The user's next utterance 'Advantage Savings**' associated with the input mode 'gesture' may be a selection, by the user, of a displayed selectable icon entitled 'Advantage Savings**.'

Labels displayed in the label 409 column may be exemplary labels assigned to the displayed utterances by the utterance sentiment classifier. Scores displayed in the sentiment score 411 column may be scores assigned to the displayed utterances by the sequential neural network classifier.

FIGS. 5A-5B show an exemplary interaction between a user and an interactive response system in diagram 501. The exemplary interaction illustrated in diagram 501 is an interaction for which the sequential neural network classifier assigned negative sentiment scores. Data displayed in diagram 501 for each interaction includes utterance 503, response 505, label 507 and sentiment score 509.

An input mode is not displayed in diagram 501. The exemplary interaction illustrated in diagram 501 may be an interaction between a user and an interactive voice response system. As such, each of the user's utterances may be vocal utterances.

Labels displayed in the label 507 column may be exemplary labels assigned to the displayed utterances by the utterance sentiment classifier. Scores displayed in the sentiment score 509 column may be scores assigned to the displayed utterances by the sequential neural network classifier.

FIG. 6 shows a portion of an exemplary interaction between a user and an interactive response system in diagram 601. The exemplary interaction illustrated in diagram 601 may be an interaction between a user and an interactive voice response system. For each interaction between the user and the interactive response system, diagram 601 illustrates the following data: utterance 603, response 605, label 607 and sentiment score 609.

In diagram 601, deflection point 611 is identified. In FIG. 6, deflection point 611 is an identified exchange between the user and the system, during the interaction, before which the sentiment scores were positive/zero valued, and after which the sentiment score were negative values. Identification of deflection point 611 may assist the conversation manager in identifying suboptimal responses by the interactive response system and draw attention to workflows that may need to be fixed, deleted or updated.

Labels displayed in the label 607 column may be exemplary labels assigned to the displayed utterances by the utterance sentiment classifier. Scores displayed in the sentiment score 609 column may be scores assigned to the displayed utterances by the sequential neural network classifier.

Figure 7:
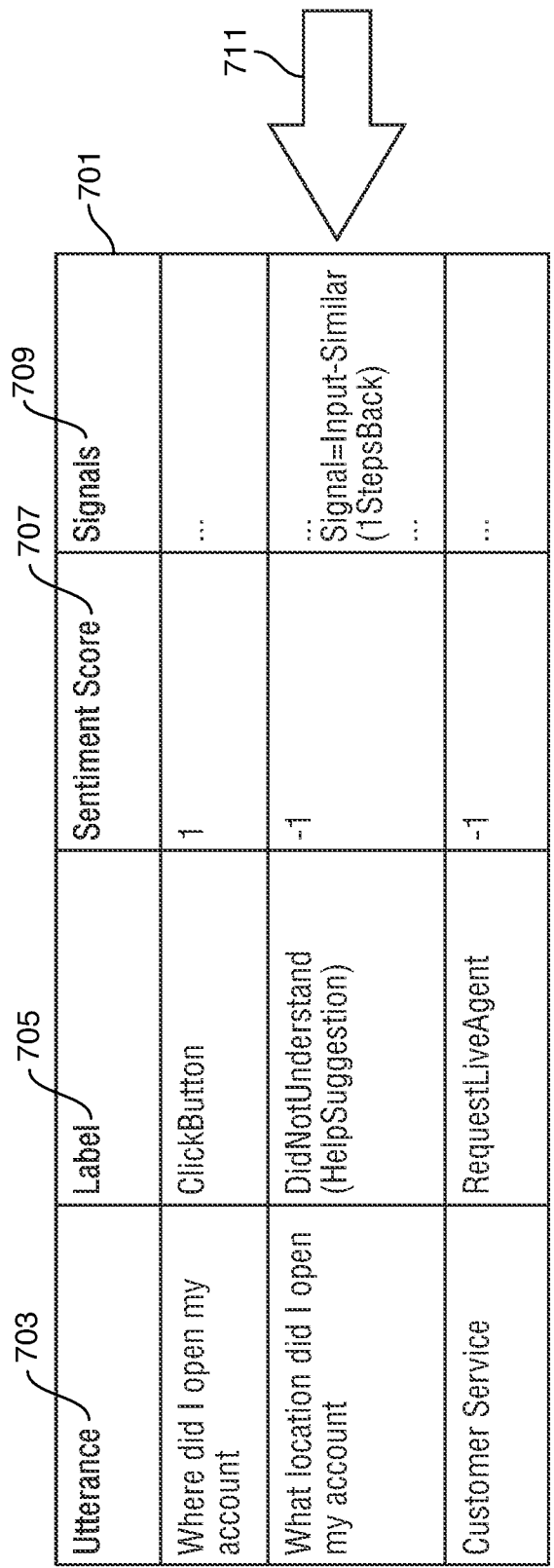
FIG. 7 shows an illustrative flow diagram in accordance with the invention.

FIG. 7 shows a portion of an exemplary interaction between a user and an interactive response system in diagram 701. The exemplary interaction illustrated in diagram 701 may be an interaction between a user and an interactive voice response system. For each interaction between the user and the interactive response system, diagram 701 illustrates the following data: utterance 703, label 705, sentiment score 707 and signals 709.

In diagram 701, deflection point 711 is identified. In FIG. 7, deflection point 711 is a signal generated by the signal extractor for an utterance immediately prior to an utterance request, by the user, for customer service. The signal at deflection point 711 is 'Signal=Input-Similar(1 StepsBack).' This signal may indicate that utterance processed by the signal extractor (i.e., "What location did I open my account) is similar to an utterance immediately preceding the processed utterance (i.e., "What location did I open my account"). Repetition, by a user, of an idea immediately preceding a request to contact customer service may be information useful to the customer service agent when the call is transferred. This information may be displayed to the customer service representative when the call is transferred or, if the call is not transferred, stored in a database for future analysis. Utterances that are repeated prior to a request for customer service may identify a suboptimal response by the interactive response system and draw attention to workflows that may need to be fixed, deleted or updated.

Labels displayed in the label 705 column may be exemplary labels assigned to the displayed utterances by the utterance sentiment classifier. Scores displayed in the sentiment score 707 column may be scores assigned to the displayed utterances by the sequential neural network classifier. Signals displayed in signals 709 may be exemplary signals applied to an utterance by the signal extractor.

Figure 8:
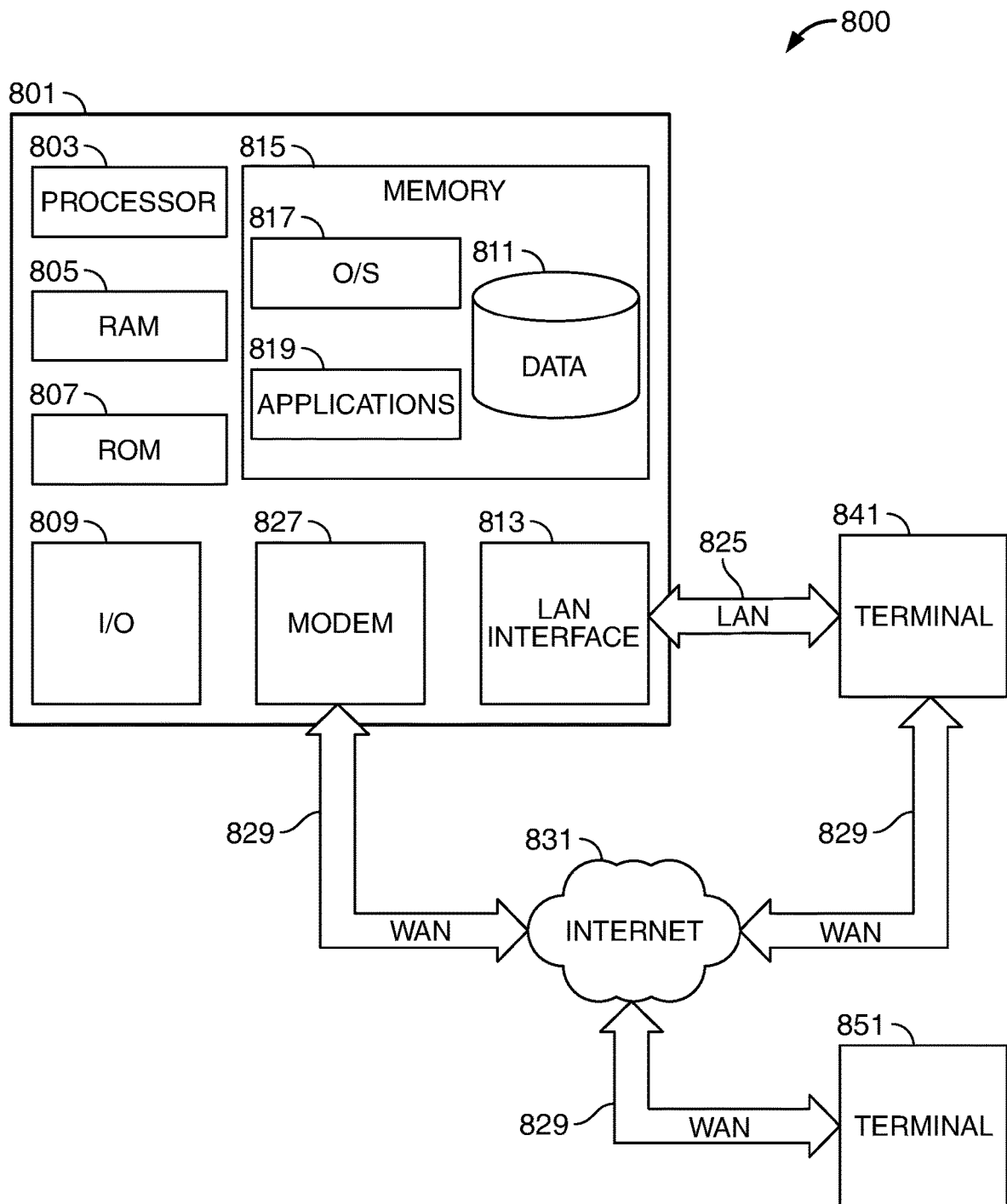
FIG. 8 shows illustrative block diagram of apparatus in accordance with the invention.

FIG. 8 shows an illustrative block diagram of system 800 that includes computer 801. Computer 801 may alternatively be referred to herein as an "engine," "server" or a "computing device." Computer 801 may be a workstation, desktop, laptop, tablet, smart phone, or any other suitable computing device. Elements of system 800, including computer 801, may be used to implement various aspects of the systems and methods disclosed herein. Each of the apparatus illustrated in FIG. 1, including user device 101, interactive response system 102, conversation manager 103, NLP 105, signal extractor 107, utterance sentiment classifier 109 and sequential neural network classifier 111, may include some or all of the elements and apparatus of system 800.

Computer 801 may have a processor 803 for controlling the operation of the device and its associated components, and may include RAM 805, ROM 807, input/output circuit 809, and a non-transitory or non-volatile memory 815. Machine-readable memory may be configured to store information in machine-readable data structures. The processor 803 may also execute all software running on the computer—e.g., the operating system and/or voice recognition software. Other components commonly used for computers, such as EEPROM or Flash memory or any other suitable components, may also be part of the computer 801.

The memory 815 may be comprised of any suitable permanent storage technology—e.g., a hard drive. The memory 815 may store software including the operating system 817 and application(s) 819 along with any data 811 needed for the operation of the system 800. Memory 815 may also store videos, text, and/or audio assistance files. The data stored in Memory 815 may also be stored in cache memory, or any other suitable memory.

Input/output ("I/O") module 809 may include connectivity to a microphone, keyboard, touch screen, mouse, and/or stylus through which input may be provided into computer 801. The input may include input relating to cursor movement. The input/output module may also include one or more speakers for providing audio output and a video display device for providing textual, audio, audiovisual, and/or graphical output. The input and output may be related to computer application functionality.

System 800 may be connected to other systems via a local area network (LAN) interface 813. System 800 may operate in a networked environment supporting connections to one or more remote computers, such as terminals 841 and 851. Terminals 841 and 851 may be personal computers or servers that include many or all of the elements described above relative to system 800. The network connections depicted in FIG. 8 include a local area network (LAN) 825 and a wide area network (WAN) 829, but may also include other networks. When used in a LAN networking environment, computer 801 is connected to LAN 825 through a LAN interface 813 or an adapter. When used in a WAN networking environment, computer 801 may include a modem 827 or other means for establishing communications over WAN 829, such as Internet 831. Connections between System 800 and Terminals 851 and/or 841 may be used for conversation manager 103 to communicate with user device 101.

It will be appreciated that the network connections shown are illustrative and other means of establishing a communications link between computers may be used. The existence of various well-known protocols such as TCP/IP, Ethernet, FTP, HTTP and the like is presumed, and the system can be operated in a client-server configuration to permit retrieval of data from a web-based server or API. Web-based, for the purposes of this application, is to be understood to include a cloud-based system. The web-based server may transmit data to any other suitable computer system. The web-based server may also send computer-readable instructions, together with the data, to any suitable computer system. The computer-readable instructions may be to store the data in cache memory, the hard drive, secondary memory, or any other suitable memory.

Additionally, application program(s) 819, which may be used by computer 801, may include computer executable instructions for invoking functionality related to communication, such as e-mail, Short Message Service (SMS), and voice input and speech recognition applications. Application program(s) 819 (which may be alternatively referred to herein as "plugins," "applications," or "apps") may include computer executable instructions for invoking functionality related to performing various tasks. Application programs 819 may utilize one or more algorithms that process received executable instructions, perform power management routines or other suitable tasks. Application programs 819 may utilize one or more decisioning processes for the processing of calls received from calling sources as detailed herein.

Application program(s) 819 may include computer executable instructions (alternatively referred to as "programs"). The computer executable instructions may be embodied in hardware or firmware (not shown). The computer 801 may execute the instructions embodied by the application program(s) 819 to perform various functions.

Application program(s) 819 may utilize the computer-executable instructions executed by a processor. Generally, programs include routines, programs, objects, components, data structures, etc. that perform particular tasks or implement particular abstract data types. A computing system may be operational with distributed computing environments where tasks are performed by remote processing devices that are linked through a communications network. In a distributed computing environment, a program may be located in both local and remote computer storage media including memory storage devices. Computing systems may rely on a network of remote servers hosted on the Internet to store, manage, and process data (e.g., "cloud computing" and/or "fog computing").

Any information described above in connection with data 811, and any other suitable information, may be stored in memory 815. One or more of applications 819 may include one or more algorithms that may be used to implement features of the disclosure comprising the processing of the utterance by NLP 105, the extracting of signals by signal extractor 107, the outputting of a label by utterance sentiment classifier 109 and the processing of the labels to identify a sentiment score by sequential neural network classifier 111.

The invention may be described in the context of computer-executable instructions, such as applications 819, being executed by a computer. Generally, programs include routines, programs, objects, components, data structures, etc., that perform particular tasks or implement particular data types. The invention may also be practiced in distributed computing environments where tasks are performed by remote processing devices that are linked through a communications network. In a distributed computing environment, programs may be located in both local and remote computer storage media including memory storage devices. It should be noted that such programs may be considered, for the purposes of this application, as engines with respect to the performance of the particular tasks to which the programs are assigned.

Computer 801 and/or terminals 841 and 851 may also include various other components, such as a battery, speaker, and/or antennas (not shown). Components of computer system 801 may be linked by a system bus, wirelessly or by other suitable interconnections. Components of computer system 801 may be present on one or more circuit boards. In some embodiments, the components may be integrated into a single chip. The chip may be silicon-based.

Terminal 851 and/or terminal 841 may be portable devices such as a laptop, cell phone, Blackberry™, tablet, smartphone, or any other computing system for receiving, storing, transmitting and/or displaying relevant information. Terminal 851 and/or terminal 841 may be one or more user devices. Terminals 851 and 841 may be identical to system 800 or different. The differences may be related to hardware components and/or software components.

The invention may be operational with numerous other general purpose or special purpose computing system environments or configurations. Examples of well-known computing systems, environments, and/or configurations that may be suitable for use with the invention include, but are not limited to, personal computers, server computers, handheld or laptop devices, tablets, mobile phones, smart phones and/or other personal digital assistants ("PDAs"), multiprocessor systems, microprocessor-based systems, cloud-based systems, programmable consumer electronics, network PCs, minicomputers, mainframe computers, distributed computing environments that include any of the above systems or devices, and the like.

Figure 9:
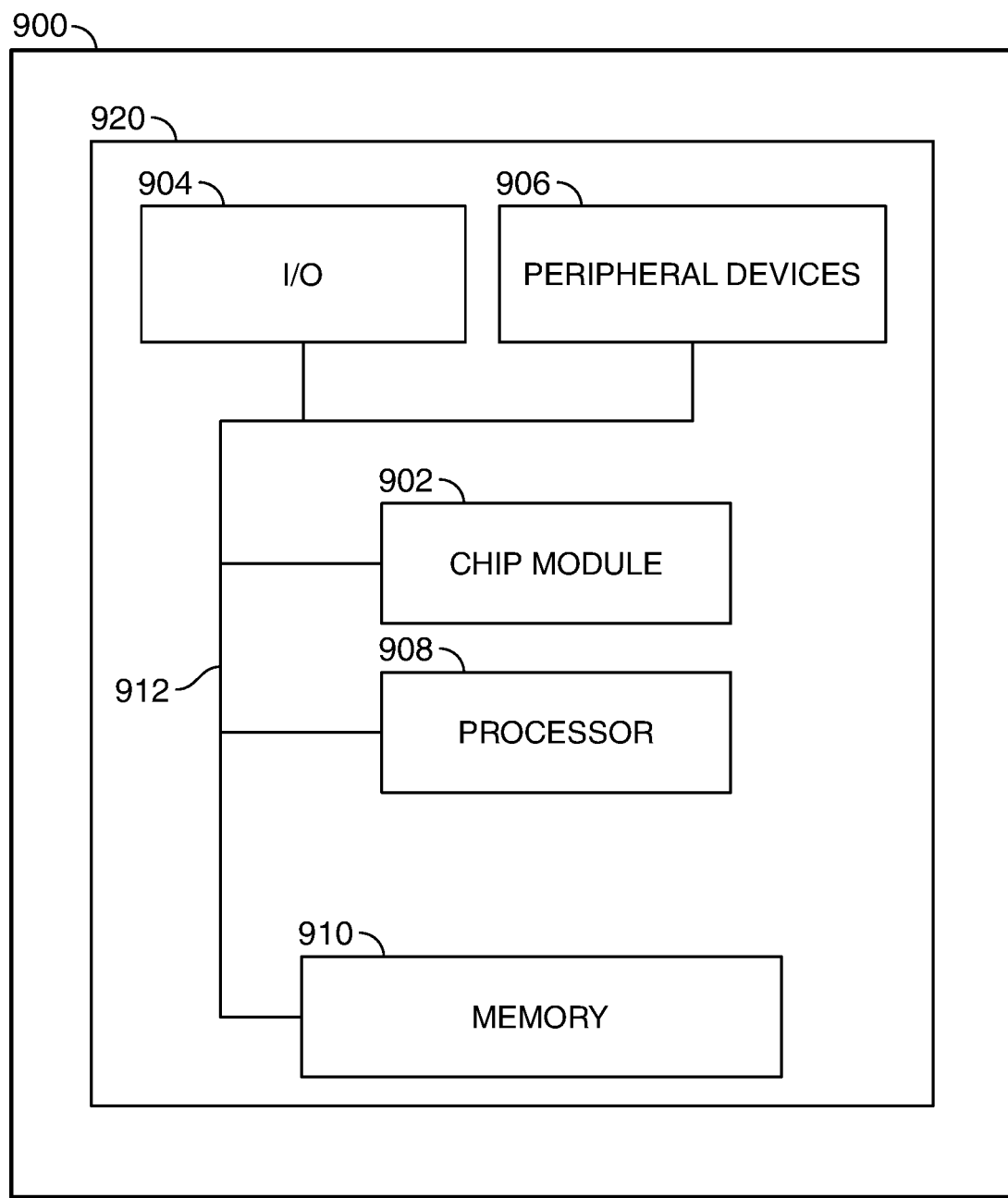
FIG. 9 shows illustrative apparatus that may be configured in accordance with the invention.

FIG. 9 shows illustrative apparatus 900 that may be configured in accordance with the principles of the disclosure. Apparatus 900 may be a computing device. Apparatus 900 may include one or more features of the apparatus shown in FIG. 8. Apparatus 900 may include chip module 902, which may include one or more integrated circuits, and which may include logic configured to perform any other suitable logical operations.

Apparatus 900 may include one or more of the following components: I/O circuitry 904, which may include a transmitter device and a receiver device and may interface with fiber optic cable, coaxial cable, telephone lines, wireless devices, PHY layer hardware, a keypad/display control device or any other suitable media or devices; peripheral devices 906, which may include counter timers, real-time timers, power-on reset generators or any other suitable peripheral devices; logical processing device 908, which may compute data structural information and structural parameters of the data; and machine-readable memory 910.

Machine-readable memory 910 may be configured to store in machine-readable data structures: machine executable instructions, (which may be alternatively referred to herein as "computer instructions" or "computer code"), applications such as applications 819, signals, and/or any other suitable information or data structures.

Components 902, 904, 906, 908 and 910 may be coupled together by a system bus or other interconnections 912 and may be present on one or more circuit boards such as circuit board 920. In some embodiments, the components may be integrated into a single chip. The chip may be silicon-based.

Figure 10:
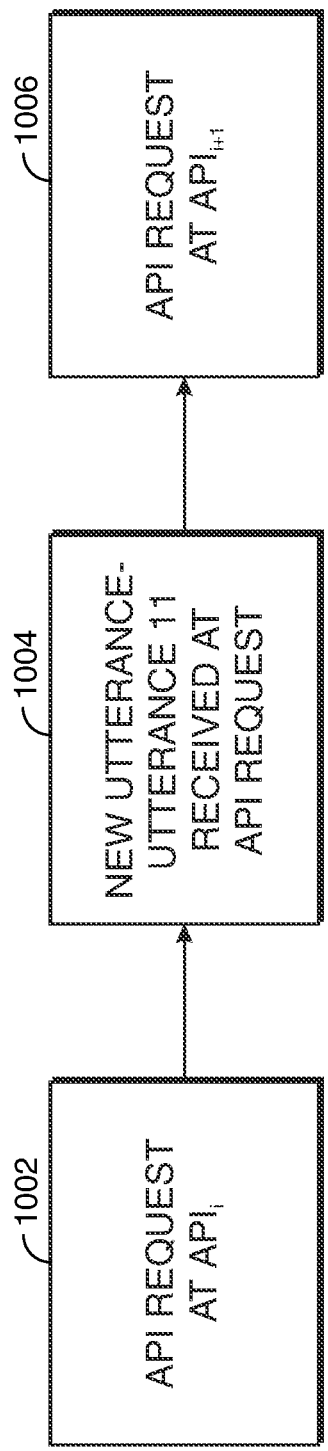
FIG. 10 shows an illustrative flow diagram for use in accordance with the invention.

FIG. 10 shows an illustrative diagram of an API request. At 1002, the memory within API request at APIi may store a pre-determined maximum number of previous utterances.

At 1004, when a new utterance is received at the API request, the earliest previous stored utterance may be deleted from within the memory to enable a storing of the new utterance, utterance "11".

At 1006, the API request may be at state APIi+1 wherein the earliest previous utterance is deleted and the new utterance may now be appended to the API request.

Figure 11:
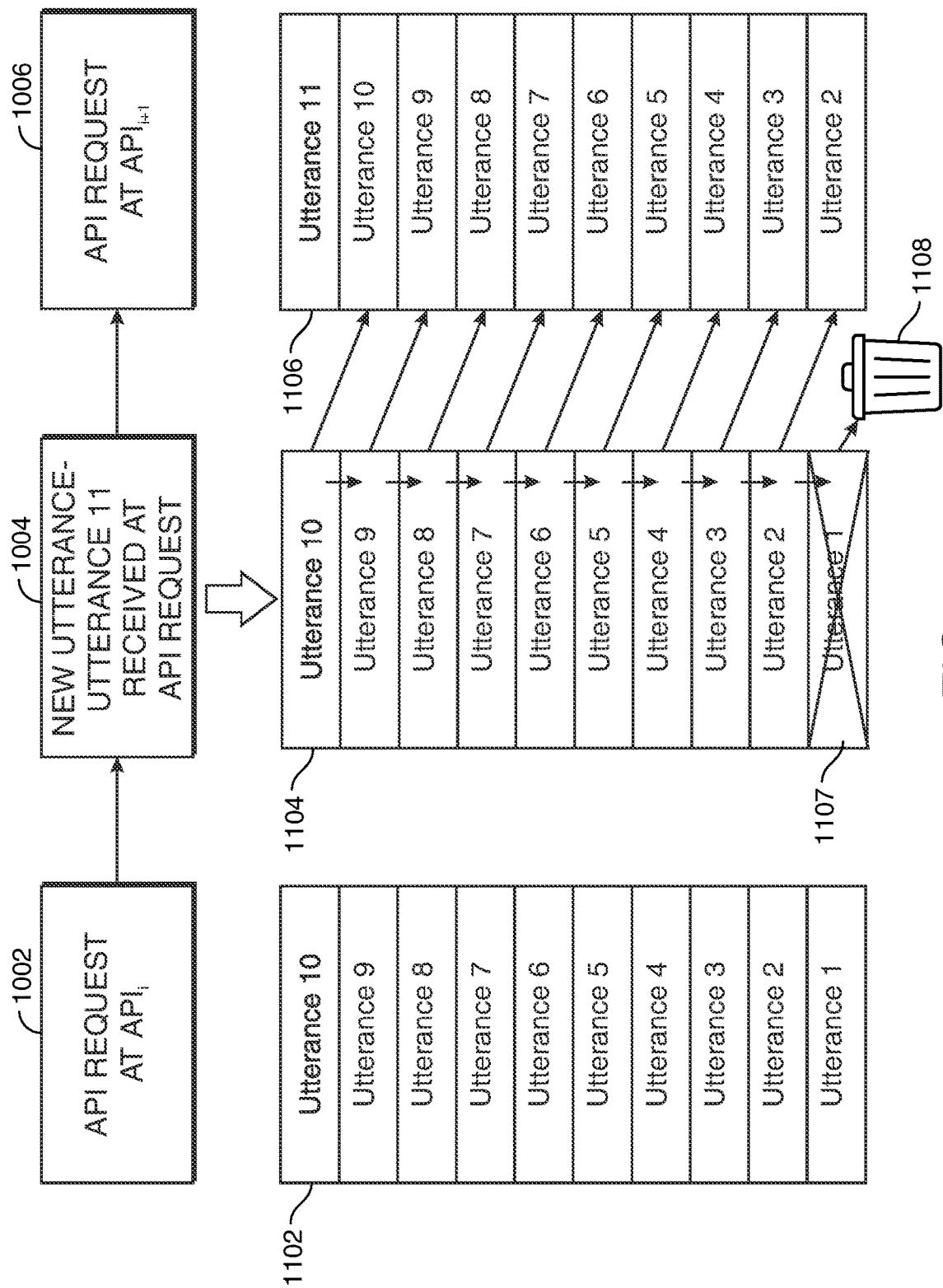
FIG. 11 shows another illustrative flow diagram for use in accordance with the invention.

FIG. 11 shows an illustrative diagram of an API request as shown at FIG. 10. FIG. 11 shows the API request of FIG. 10 with additional details.

At 1102, the configurable memory within the API request may store a pre-determined maximum number of previous utterances. The pre-determined maximum number, in this example, may be ten. Utterance "1" may be the earliest-in-time, currently-stored, previous utterance in this API request.

At 1104, a new utterance is received at the API request. The new utterance, utterance "11", may exceed the pre-determined maximum number of 10 utterances. The earliest-in-time, currently-stored, previous utterance 1107, may be deleted from the API request, as shown at 1108. Following the deletion, each of utterances "2"-"10" may be shifted within the memory to enable storage of the new utterance in the most recently-stored utterance memory slot.

It should be appreciated that the utterances may be continue to be maintained in sequential order following the deletion.

At 1106, the API request shows an illustrative storage of each of the previous utterances "2"-"10" and the new utterance, utterance "1".

Thus, METHODS AND APPARATUS FOR LEVERAGING AN APPLICATION PROGRAMMING INTERFACE ("API") REQUEST FOR STORING A LIST OF SENTIMENT VALUES IN REAL TIME INTERACTIVE RESPONSE SYSTEMS are provided. Persons skilled in the art will appreciate that the present invention can be practiced by other than the described embodiments, which are presented for purposes of illustration rather than of limitation. The present invention is limited only by the claims that follow.

What is claimed is:

1. Apparatus for providing pre-processing of a user utterance prior to feeding utterance-related data to a sequential neural network classifier for conversation sentiment scoring, the utterance being expressed, by a user, to an interactive response system during an interaction between the user and the interactive response system, said apparatus comprising a plurality of distributed servers, each of the plurality of distributed servers comprising:

a conversation manager comprising a first processor for receiving a stateless application programming interface ("API") request, the API request for storing, in a configurable memory, the utterance, previous utterance data and a sequence of labels, each label in the sequence of labels being associated with a previous utterance expressed by a user during the interaction, said previous utterance data being limited to a pre-determined number of utterances occurring immediately prior to the utterance;

a natural language processor, in electronic communication with the first processor, for processing the utterance to output an utterance intent, a semantic meaning of the utterance and an utterance parameter, the utterance parameter comprising one or more words included in the utterance and being associated with the intent, the natural language processor further configured to append the utterance intent, the semantic meaning of the utterance and the utterance parameter to the API request;

a signal extractor for processing the utterance, the utterance intent, the semantic meaning, the utterance parameter, and the previous utterance data extracted from the API request to generate a plurality of utterance signals, wherein the signal extractor is configured to append the plurality of utterance signals to the API request;

an utterance sentiment classifier comprising:
  a memory for storing a hierarchy of rules, each rule in the hierarchy of rules being associated with one or more rule signals and a label;
  a second processor for, in response to receiving the one or more utterance signals from the signal extractor, iterating through the hierarchy of rules to identify a first rule in the hierarchy for which the one or more utterance signals is a superset of the first rule's one or more rule signals;
  wherein the second processor is further configured to append, to the sequence of labels stored in the API request, a label associated with the first rule;

the sequential neural network classifier for:
  receiving a data input including the sequence of labels and the label associated with the first rule, the data input not including the utterance;
  processing the data input using a trained algorithm; and
  based on the processing, appending a sentiment score to the API request, said sentiment score being associated, within the API request, to the utterance;

the conversation manager for:
  identifying a response to the user utterance based on the utterance intent, the label and the sentiment score;
  appending the response to the API request; and
  after the appending, transmitting the API request to the interactive response system; and the interactive response system for receiving the API request and outputting the response included therein to the user;

wherein:
  the pre-processing of the utterance by the natural language processor, the signal extractor and the utterance sentiment classifier reduces the data input to the label and the sequence of labels, thereby increasing a speed at which the sequential neural network classifier returns the sentiment score and decreasing resources consumed by the sequential neural network classifier when processing the data input.

2. The apparatus of claim 1, wherein the configurable memory is configurable to store a first quantity of utterance signals.

3. The apparatus of claim 2, wherein the configurable memory is configured to store 10 utterance signals.

4. The apparatus of claim 1 wherein the utterance sentiment classifier is further configured to, in response to a determination that a stored previous utterance is associated with the first rule and the sentiment score associated with the previous utterance is above a threshold value, terminate the iterating.

5. The apparatus of claim 1 wherein the previous utterance data includes, for each previous utterance expressed by the user during the interaction:
   the previous utterance;
   an intent of the previous utterance; and
   a parameter of the previous utterance.

6. The apparatus of claim 1 wherein the previous utterance data includes data relating to the pre-determined number of previous utterances, the previous utterance data, for each previous utterance, including:
   the previous utterance;
   an intent; and
   a term in the previous utterance associated with the intent.

7. The apparatus of claim 1 wherein the signal extractor generates an utterance signal in response to a determination that the utterance intent is identical to an intent of a previous utterance.

8. The apparatus of claim 1 wherein:
   the previous utterance data includes a plurality of semantic meanings, each of the plurality of semantic meanings being associated with one of the plurality of previous utterances; and
   the signal extractor generates an utterance signal in response to a determination that the semantic meaning of the utterance is substantially similar to a semantic meaning associated with one of the plurality of previous utterances.

9. The apparatus of claim 1 further comprising a third processor for feeding the sequential neural network with training data prior to the sequential neural network receiving the data input, the training comprising feeding an untrained algorithm with multiple sequences of labels, each label stored in each sequence of labels being associated with a sentiment score, wherein the training modifies the untrained algorithm to become the trained algorithm.

10. Apparatus for providing pre-processing of a user utterance prior to feeding utterance-related data to a sequential neural network classifier for conversation sentiment scoring, the utterance being expressed, by a user, to an interactive response system during an interaction between the user and the interactive response system, said apparatus comprising a plurality of distributed servers, each of the plurality of distributed servers comprising:
   a conversation manager comprising a first processor for:
      receiving a stateless application programming interface ("API") request, the API request for storing in a configurable memory, previous utterance data including a pre-determined number of previous utterances expressed by the user during the interaction, and a sequence of labels, each label in the sequence of labels being associated with one of the previous utterances;
      deleting an earliest-received one of the prior utterances and previous utterance data associated therewith; and
      storing the utterance;
   a natural language processor, in electronic communication with the first processor, for processing the utterance to output an utterance intent, a semantic meaning of the utterance and an utterance parameter, the utterance parameter comprising one or more words included in the utterance and being associated with the intent, the natural language processor further configured to append the utterance intent, the semantic meaning of the utterance and the utterance parameter to the API request;
   a signal extractor for processing the utterance, the utterance intent, the semantic meaning, the utterance parameter, and the previous utterance data extracted from the API request to generate a plurality of utterance signals, wherein the signal extractor is configured to append the plurality of utterance signals to the API request;
   an utterance sentiment classifier comprising:
      a memory for storing a hierarchy of rules, each rule in the hierarchy of rules being associated with one or more rule signals and a label; and
      a second processor for, in response to receiving the one or more utterance signals from the signal extractor, iterating through the hierarchy of rules to identify a first rule in the hierarchy for which the one or more utterance signals is a superset of the first rule's one or more rule signals;
      wherein the second processor is further configured to append, to the sequence of labels stored in the API request, a label associated with the first rule;
   the sequential neural network classifier for:
      receiving a data input including the sequence of labels and the label associated with the first rule, the data input not including the utterance;
      processing the data input using a trained algorithm; and
      based on the processing, appending a sentiment score to the API request, said sentiment score being associated, within the API request, to the utterance;
   the conversation manager for:
      identifying a response to the user utterance based on the utterance intent, the label and the sentiment score;
      appending the response to the API request; and
      after the appending, transmitting the API request to the interactive response system; and
   the interactive response system for receiving the API request and outputting the response included therein to the user;
   wherein:
      the pre-processing of the utterance by the natural language processor, the signal extractor and the utterance sentiment classifier reduces the data input to the label and the sequence of labels, thereby increasing a speed at which the sequential neural network classifier returns the sentiment score and decreasing resources consumed by the sequential neural network classifier when processing the data input.

11. The apparatus of claim 10, wherein the configurable memory is configurable to store a first quantity of utterance signals.

12. The apparatus of claim 11, wherein the configurable memory is configured to store 10 utterance signals.

13. The apparatus of claim 10 wherein the utterance sentiment classifier is further configured to, in response to a determination that a stored previous utterance is associated with the first rule and the sentiment score associated with the previous utterance is above a threshold value, terminate the iterating.

14. The apparatus of claim 10 wherein the previous utterance data includes, for each previous utterance expressed by the user during the interaction:
- the previous utterance;
- an intent of the previous utterance; and
- a parameter of the previous utterance.

15. The apparatus of claim 10 wherein the previous utterance data includes data relating to the pre-determined number of previous utterances, the previous utterance data, for each previous utterance, including:
- the previous utterance;
- an intent; and
- a term in the previous utterance associated with the intent.

16. The apparatus of claim 10 wherein the signal extractor generates an utterance signal in response to a determination that the utterance intent is identical to an intent of a previous utterance.

17. The apparatus of claim 10 wherein:
- the previous utterance data includes a plurality of semantic meanings, each of the plurality of semantic meanings being associated with one of the previous utterances; and
- the signal extractor generates an utterance signal in response to a determination that the semantic meaning of the utterance is substantially similar to a semantic meaning associated with one of the previous utterances.

18. The apparatus of claim 10 further comprising a third processor for feeding the sequential neural network with training data prior to the sequential neural network receiving the data input, the training comprising feeding an untrained algorithm with multiple sequences of labels, each label stored in each sequence of labels being associated with a sentiment score, wherein the training modifies the untrained algorithm to become the trained algorithm.

19. A method for processing a user utterance prior to feeding utterance-related data to a sequential neural network classifier for conversation sentiment scoring, the utterance being expressed, by a user, to an interactive response system during an interaction between the user and the interactive response system, said method being performed on at least one of a plurality of distributed servers, said method comprising:
- receiving, using a first processor associated with a conversation manager, a stateless application programming interface ("API") request, the API request for storing, in a configurable memory, the utterance, previous utterance data and a sequence of labels, each label in the sequence of labels being associated with a previous utterance expressed by a user during the interaction, said previous utterance data being limited to a pre-determined number of utterances occurring immediately prior to the utterance;
- processing the utterance, using a natural language processor in electronic communication with the first processor, to output an utterance intent, a semantic meaning of the utterance and an utterance parameter, the utterance parameter comprising one or more words included in the utterance and being associated with the intent, the natural language processor further configured to append the utterance intent, the semantic meaning of the utterance and the utterance parameter to the API request;
- processing, using a signal extractor processor, the utterance, the utterance intent, the semantic meaning, the utterance parameter, and the previous utterance data extracted from the API request to generate a plurality of utterance signals, wherein the signal extractor processor is configured to append the plurality of utterance signals to the API request;
- using an utterance sentiment classifier to:
  - store a hierarchy of rules in a memory, each rule in the hierarchy of rules being associated with one or more rule signals and a label;
  - use a second processor to, in response to receiving the one or more utterance signals from the signal extractor processor, iterate through the hierarchy of rules to identify a first rule in the hierarchy for which the one or more utterance signals is a superset of the first rule's one or more rule signals;
  - append, using the second processor, to the sequence of labels stored in the API request, a label associated with the first rule;
- using a sequential neural network classifier:
  - receive a data input including the sequence of labels and the label associated with the first rule, the data input not including the utterance;
  - process the data input using a trained algorithm; and
  - based on the processing, append a sentiment score to the API request, said sentiment score being associated, within the API request, to the utterance;
- using the first processor to:
  - identify, a response to the user utterance based on the utterance intent, the label and the sentiment score;
  - append, the response to the API request; and
  - after the appending, transmit the API request to the interactive response system; and
- receiving, using the interactive response system, the API request and outputting the response included therein to the user;

wherein:
- the pre-processing of the utterance by the natural language processor, the signal extractor processor and the utterance sentiment classifier reduces the data input to the label and the sequence of labels, thereby increasing a speed at which the sequential neural network classifier returns the sentiment score and decreasing resources consumed by the sequential neural network classifier when processing the data input.

* * * * *